United States Patent [19]

Tjarksen et al.

[11] 4,180,147

[45] Dec. 25, 1979

[54] INTEGRAL PISTON AND ADJUSTER FOR A BRAKE

[75] Inventors: Richard A. Tjarksen; Robert J. Keresztes; Eugene E. Harnish, all of South Bend, Ind.

[73] Assignee: The Bendix Corporation, Southfield, Mich.

[21] Appl. No.: 892,448

[22] Filed: Apr. 3, 1978

[51] Int. Cl.² ............................................. F16D 65/54
[52] U.S. Cl. ................................. 188/71.8; 188/196 P
[58] Field of Search .............. 188/71.8, 196 R, 196 P; 192/111 A

[56] References Cited

U.S. PATENT DOCUMENTS

| | | | |
|---|---|---|---|
| 3,095,064 | 6/1963 | Tankersley et al. | 188/71.8 |
| 3,338,353 | 8/1967 | Lucien | 188/71.8 |
| 3,542,165 | 11/1970 | Lucien | 188/71.8 |
| 3,729,072 | 4/1973 | Borkowski | 188/71.8 |
| 3,811,366 | 5/1974 | Angelis et al. | 188/196 P |
| 3,990,547 | 11/1976 | Plaat | 188/196 R |
| 4,006,669 | 2/1977 | Price | 188/71.8 |

*Primary Examiner*—Edward R. Kazenske
*Attorney, Agent, or Firm*—Leo H. McCormick, Jr.; Ken C. Decker

[57] ABSTRACT

An actuator mechanism for a brake having a plurality of friction disc compressed between a pressure plate and a backing plate. The actuator mechanism has a piston located in a bore of a housing. A pin fixed to the housing extends through and locates the piston in the bore. A first tube made of an insulator material is located in the bore between the piston and the pressure plate. A second tube concentric to the first tube has an inwardly projecting flange adjacent to the piston and an outwardly projecting flange. A keeper attached to the first tube cages a spring between the outward projecting flange and the first tube. A third tube which engages the inwardly projecting flange is connected to the pin through a button fastener thereby establishing an air gap between the first tube and the pressure plate. The piston, in response to an operational input, initially moves in the bore by overcoming the spring and brings the first tube into engagement with the pressure plate to eliminate the air gap. At the same time, the piston engages the inwardly projecting flange to establish a solid linkage between the piston and the third tube. Further movement of the piston deforms the third tube and moves the third tube with respect to the pin. Upon termination of the operational input, the third tube remains stationary and the spring moves the first tube to reestablish an air gap of substantially the same initial dimension after every brake application. The air gap forms a barrier to reduce the transfer of thermal energy between the friction disc and the end of the first tube. Since the first tube is an insulator material, the transfer of thermal energy through the first tube is substantially reduced and damage to the seals in the piston which could cause a brake failure eliminated.

4 Claims, 3 Drawing Figures

INTEGRAL PISTON AND ADJUSTER FOR A BRAKE

BACKGROUND OF THE INVENTION

This invention relates to an automatic brake adjuster for use in an aircraft disc brake. As disclosed in U.S. Pat. No. 3,376,959, it is common practice to provide aircraft wheel brakes with an adjuster mechanism to compensate for wear of the friction lining. Such adjuster mechanisms include a plurality of reset devices interspersed between a corresponding plurality of actuator pistons attached to a pressure plate through which a brake force is applied to a stack of friction discs. Unfortunately, after repeated brake applications, the pressure plate may become distorted because of unequal brake forces applied thereto by the individual actuator pistons or uneven wear of the individual friction linings in the disc brakes.

To reduce the possibility of distorting the pressure plates or uneven wear it was found, as disclosed in U.S. Pat. No. 3,958,670, that by locating a reset device in an individual actuator, the forces on the pressure plate are essentially coaxial. However, it has been found that the components of the reset device and actuator piston may deteriorate after a period of use because of the transfer of thermal energy from friction disc through the pressure plate.

SUMMARY OF THE INVENTION

The present invention provides each actuator mechanism with an automatic brake adjuster to establish an air gap between the pressure plate and each actuator piston in a brake system and thereby provide a barrier through which the transfer of thermal energy created in the friction disc is inhibited. Each actuator mechanism has a piston located in an axial bore of a housing. The piston is located in the bore by a stem or pin to establish a chamber in the bore. The chamber is connected to a source of fluid. A first tube located in the bore has a lip thereon for engaging a first end of a spring. A retainer member which contacts a second end of the spring is positioned on the first tube by a keeper member to cage the spring within the first tube. A second tube which is held on the stem by a button member engages the retainer member and positions the first tube a predetermined distance from the pressure plate to establish an air gap with the friction lining.

Whenever a brake application is initiated, pressurized fluid is presented to the chamber. The pressurized fluid acts on the actuator piston and moves the first tube toward the pressure plate after overcoming the spring to eliminate the air gap. When the air gap is eliminated, the actuator piston engages the second tube and the first tube engages the pressure plate. Thereafter, any further movement of the actuator piston by the pressurized fluid simultaneously causes the friction disc to be compressed between the pressure plate and a backing plate to effect a brake application and the second tube to elastically and plastically deform with respect to the button member.

Upon termination of the brake application, the second tube remains stationary with respect to the button member and the spring returns the first tube and actuator piston toward the chamber to reestablish an air gap having substantially the same dimension as before the brake application. Thus, any thermal energy generated through engagement of the friction disc is prevented from being transferred by conduction from the pressure plate into the actuator mechanism.

It is an object of this invention to provide a disc brake with an actuator mechanism having a piston aligned within a bore by a pin attached to the housing. A first tubular member connected to the piston is connected to the pin through a second tubular member. A keeper member attached to the pin acts on the second tubular member to hold the first tubular member a predetermined distance away from a friction lining in the disc brake and establish a brake running clearance.

It is a further object of this invention to provide a brake actuator mechanism for a disc brake with an air barrier to prevent the conductive transfer of thermal energy generated during a brake application from a friction lining member to an actuator piston and reset mechanism.

It is a further object of this invention to provide a disc brake actuator mechanism with an automatic reset device concentrically located and sealed within an actuator piston to reduce the possibility of deterioration of the reset device through thermal degredation.

These and other objects should be apparent from reading this specification in conjunction with the drawings.

DETAILED DESCRIPTION OF THE INVENTION

Figure 1:
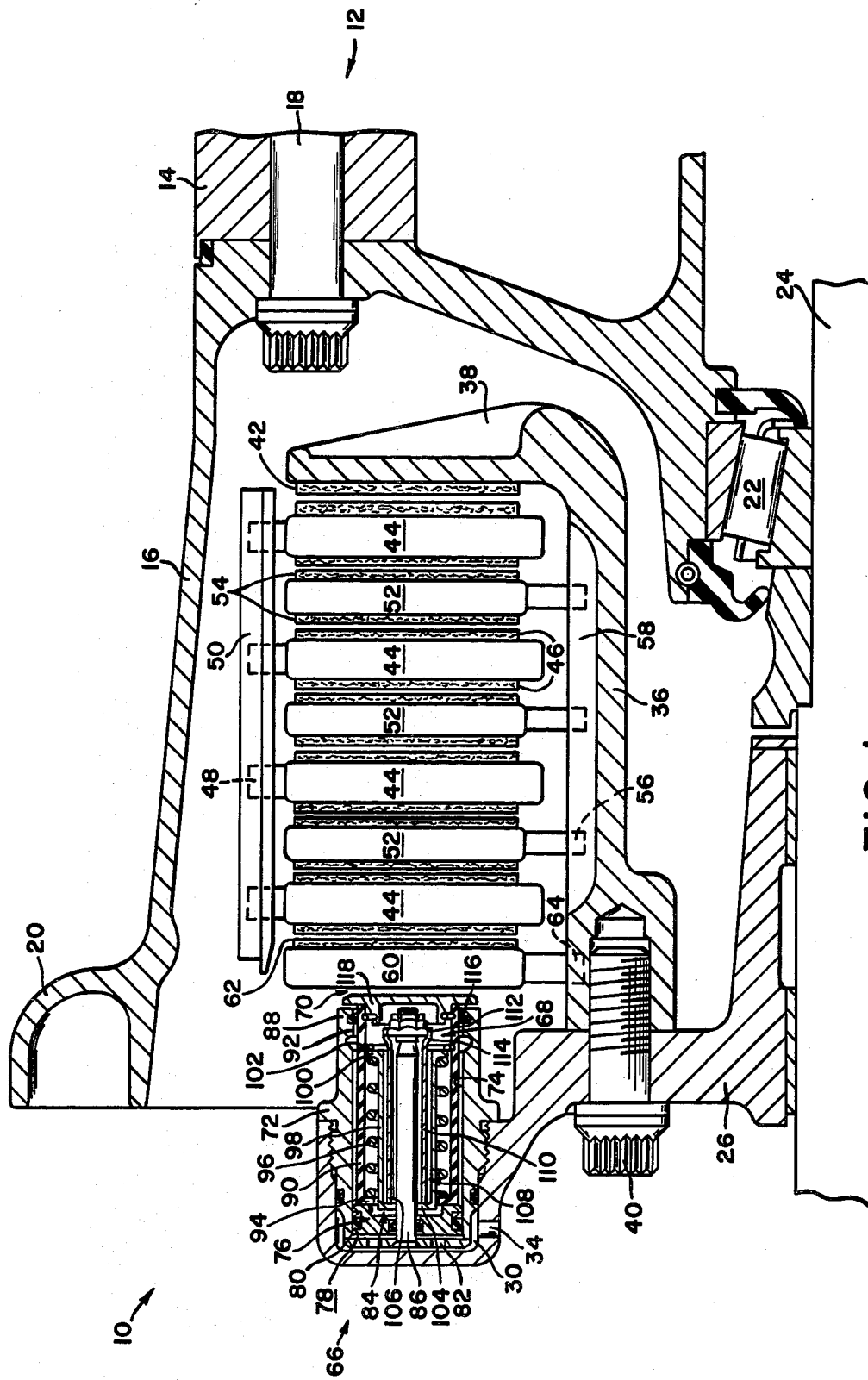
FIG. 1 is a schematic sectional view of a wheel and brake assembly incorporating the present invention.

Referring to FIG. 1, numeral 10 designates a conventional aircraft wheel and multiple disc brake assembly. Assembly 10 includes a wheel 12 (only a portion of which is shown) consisting of two annular sections 14 and 16. Annular sections 14 and 16 are fastened together by circumferentially spaced apart bolts and nuts generally indicated by 18. Each of the wheel sections 14, 16 have a circumferential tire flange 20. Reference is made to U.S. Pat. Nos. 2,990,216 and 2,998,282 for a detailed discussion of the wheel construction. The wheel 12 is rotatably journaled on bearing means 22 of a nonrotatable fixed axle 24 carried by conventional aircraft landing gear structure, not shown. An annular brake carrier 26 is secured in a nonrotatable position relative to the fixed axle 24 by any suitable means known to those skilled in the art, such as flanged mounting, wherein carrier 26 or torque tube 36 is bolted to a flange member secured to fixed axle 24, or wherein carrier 26 is fixed to the axle 24 by a torque arm member secured directly to the landing gear structure.

The brake carrier 26 is provided with a plurality of circumferentially spaced apart cavities and holes 30, only one of each is shown. Cavities 30 are fluidly connected via passage 34 to a source of pressurized fluid, not shown, controlled by the aircraft pilot. A cylindrical torque tube 36 having an integral annular backing plate 38 is fixedly secured to carrier 26 by a plurality of circumferentially spaced apart bolts 40. Backing plate 38 as shown has an annular configuration which is integral. The backing plate 38 has torque tube 36 with a friction surface 42 secured thereto also, however, many other mountings and configurations are well known to those skilled in the aircraft brake art. A plurality of spaced apart annular brake rotor members 44 having friction surfaces 46 on opposite axial faces thereof are suitably keyed at 48 to a plurality of circumferentially spaced apart key or retaining members 50. The retaining members 50, which are fixedly secured to wheel section 16, are adapted to permit axial movement of the rotor members 44 relative to wheel section 16 while rotating therewith. A plurality of nonrotatable annular brake stator members 52 having friction surfaces 54 on opposite axial faces thereof are interleaved with the rotor members 44 and keyed 56 to a plurality of circumferentially spaced apart spline sections 58 of torque tube 36 for axial movement relative therealong. A pressure plate 60 having a friction surface 62 has a projection 64 keyed to spline section 58 for axial movement therealong.

A plurality of actuator mechanisms 66, only one being shown, which are located in cavities 30, are held away from the pressure plate 60 by a resetadjust device 68 integrally associated therewith to establish an air gap 70 between the pressure plate 60 and the actuator mechanism 66. The air gap 70 forms a barrier to reduce the transfer of thermal energy created during a brake application from being transferred to the actuator mechanism 66 and thereby prevents degredation of actuator by heat transfer from the friction lining mechanism.

The actuator mechanism 66 has a cylindrical liner 72 which is threadably secured to carrier 26. A piston 76 located in the axial bore 74 of the cylindrical liner 72 cooperates with carrier 26 to define a chamber 78. A plate 80 located in axial bore 74 has a plurality of openings 82 therein to allow fluid in cavity 30 to freely flow into chamber 78. A pin or stem 86 fixed to plate 80 extends through the center of piston 76 and into the axial bore 74 to a point adjacent to the end 88 of the cylindrical liner 72. A first tube 90 made of an insulator material is located in bore 74 by a bearing surface 92. The first tube 90 has a cylindrical body with an inwardly projecting lip 94 on one end thereof adjacent piston 76. A spring 96 is located along the internal surface of the first tube 90. A retainer member 98 has a cylindrical body or tube with an outwardly projecting rib or lip 100 that engages one end of spring 96. A force applied to retainer member 98 compresses spring 96 sufficiently to allow snap ring 102 to be attached to the first tube 90 and cage spring 96 between lips 94 and 100. The retainer member 98 has an inwardly projecting lip 104 that engages end 106 of a third tube 108. The third tube 108 has a cylindrical body with a first diameter section 110 connected to a second diameter section 112 by a tapered section 114. A nut or button fastener member 120, which is attached to stem or pin 86 engages the tapered section 114 of the third tube and moves the first tube 90 toward piston 76 through the spring 96 and retainer member 98 to establish the initial size of chamber 78 and the running clearance 84 which is equal to the distance between the end of first tube 90 and pressure plate 60.

A wiper seal 116 attached to the exterior surface of the cylindrical liner 72 engages the first tube 90 to prevent dirt and friction dust from entering bore 74 and scoring piston 76. In addition, a protective cap 118 is attached to the end of first tube 90 to prevent dirt and friction dust from entering into the interior thereof and affecting the operation of the automatic reset and adjustment device 68.

MODE OF OPERATION OF THE INVENTION

When a pilot of an aircraft desires to effect a brake application on an aircraft equipped with a wheel and multiple disc brake assembly 10 shown in FIG. 1, fluid under pressure is transmitted to chamber 78 by way of passage 34 and cavity 30. The fluid under pressure presented to chamber 78 acts on piston 76 and moves the first tube 90 toward the pressure plate 60 by overcoming spring 96 to close air gap 70.

Figure 2:
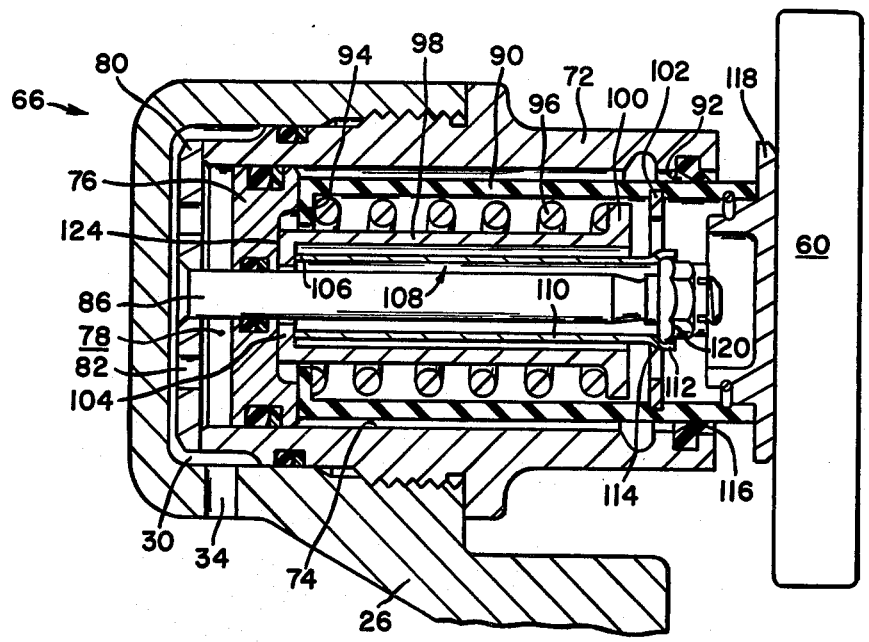
FIG. 2 is an enlarged sectional view of the actuator mechanism of FIG. 1 in an operational position.

When the piston 76 has moved a distance equal to the air gap 70 and the running clearance 84, face 124 on piston 76 engages lip 104 on the retainer member 98 to form a solid link with the third tube 108 as shown in FIG. 2. Thereafter, piston 76, in response to the fluid pressure in chamber 78, simultaneously moves the first, second and third tubes 90, 98 and 108 to compress the rotor and stator members 44 and 52 between the pressure plate 60 and the backing plate 38 to effect a brake application.

When the pressure of the fluid in chamber 78 is relieved, spring 96 acts on lip 94 to return the first tube 90 and piston 76 to a position as illustrated in FIG. 1. Since the protective cap 118 is not attached to the pressure plate 60, an air gap 70 is again established and a conductive path for the transfer of thermal energy created during the brake application interrupted. In addition, since the first tube 90 is an insulator material thermal energy transfer which could damage the seals on piston 76 is substantially eliminated and a potential failure of the actuator avoided.

Figure 3:
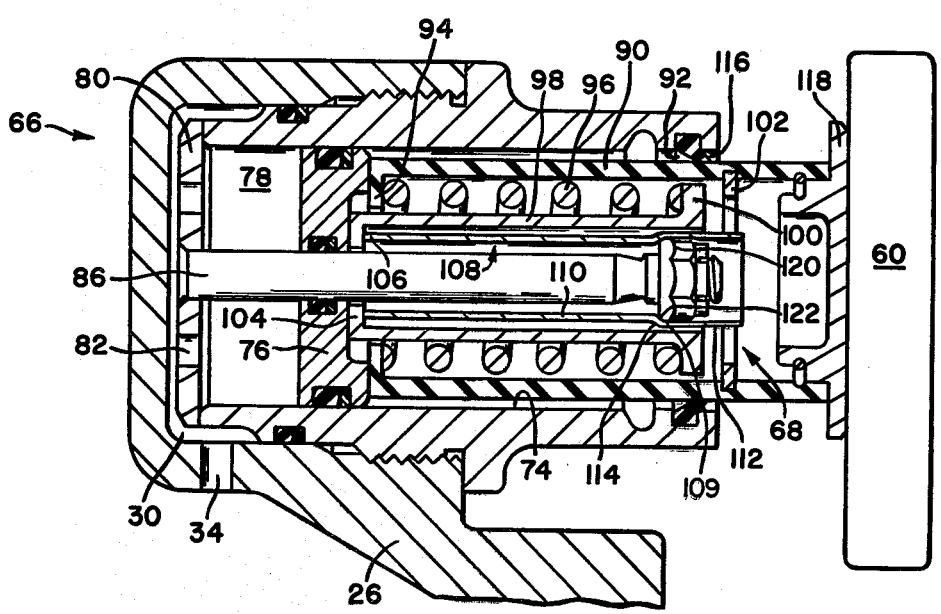
FIG. 3 is an enlarged sectional view of the actuator mechanism of FIG. 1 in an extended position.

After repeated brake applications, the friction linings, 62 on the pressure plates 60, 46 on the rotors 44, 54 on the stators 52 and 42 on the backing plate 38 are worn and reduced in thickness. However, the distance traveled by the piston 76 in bore 74 to effect a brake application remains substantially constant through the action of the reset and adjust device 68. As shown in FIG. 3, the movement of piston 76 acts through the retainer lip 104 on the third tube 108, causing the ramp section 114 to elastically expand and move over button face 122 and compress the friction linings with a force equal to the fluid pressure in chamber 78. Once a ramp surface 114 has moved past button surface 122, the expanded section 109 of the third tube 108 plastically returns to a diameter approximately equal to the second diameter 112 to lock the third tube 108 in a stationary position with respect to button surface 122 on stem or pin 86.

Thereafter, on termination of the brake signal, the fluid pressure in chamber 78 is reduced and spring 96 moves the first tube 90 and piston 76 toward chamber 78. Since the retainer member 98 is connected to the third tube 108, once snap ring 102 contacts lip 100, the movement of the first tube 90 stops. However, the air gap 70 between the protective cap 118 is again established since the relative movement of the third tube 108 with respect to the button surface 122 is a direct result of wear of the friction lining and not a factor in the running clearance or the thermal barrier dimension. Thus, the distance that piston 76 is required to move and bring the pressure plate 60 into engagement with the rotors and stator member 44 and 52 remains substantially constant after every brake application.

We claim:

1. In a brake having a plurality of friction disc located between a pressure plate and a backing plate, an actuator mechanism for moving the pressure plate toward the backing plate in response to an operational brake signal, said actuator mechanism comprising:

a housing having a bore therein;

piston means located in said bore for establishing a chamber therein, said chamber being connected to a source of fluid;

a stem fixed to said housing and extending through said piston means into said bore, said stem providing a guide to maintain said piston means in axial alignment in said bore on movement of the piston means;

a first tube member having a first cylindrical body with a radially inwardly projecting lip extending from a first end for engaging said piston means and a second end, said first cylindrical body being located in said bore by a first bearing surface and constructed of an insulator material to reduce the transfer of thermal energy from said seond end to both the piston means and housing;

a spring concentrically positioned on the interior of said first tube member having a first end engaging said inwardly projecting lip of said first cylindrical body and a second end;

a second tube member having a second cylindrical body concentric to said first cylindrical body and having a radially inwardly projecting flange on a first end and a radially outwardly projecting flange on a second end, said outwardly projecting flange engaging said second end of said spring;

keeper means attached to said first cylindrical body for engaging said radially outwardly projecting flange to hold said spring in a caged position between said inwardly projecting lip on the first cylindrical body and said outwardly projecting flange on the second cylindrical body;

a third tube member having a third cylindrical body concentric to said second cylindrical body, said third cylindrical body having a first diameter section connected to a second diameter section by an annular ramp section, said first diameter section engaging said inwardly projecting flange on said second cylindrical body; and button means secured to said stem and engaging said second diameter and tapered sections of said third cylindrical tube to position said piston means in said bore to establish the size of said chamber and to establish an air gap between the second end of the first cylindrical member and the pressure plate, said piston means responding to a pressure of the fluid in said chamber corresponding to the operational brake signal by overcoming said spring and moving said first cylindrical body through said air gap and into engagement with said pressure plate while at the same time said piston means engaging said inwardly projecting flange on said second cylindrical body to form a solid link between said piston means and said button means through said third cylindrical body, said piston means thereafter simultaneously moving said first, second and third cylindrical bodies toward said pressure plate and said pressure plate toward said backing plate to compress the plurality of friction disc and effect a brake application, said friction disc creating thermal energy during said brake application, said button means elastically and plastically expanding said first diameter section upon movement of said third cylindrical body by said piston means to lock said button means in a fixed position with respect to said third cylindrical body and hold said third cylindrical body in a stationary position upon termination of fluid pressure in said chamber to allow said spring to return said piston means toward said chamber and reestablish substantially the same dimensional air gap after every brake application, said air gap forming a barrier to reduce the transfer of thermal energy between the pressure plate and said first cylindrical body, said insulator material of said first cylindrical body further reducing the transfer of thermal energy from said second end toward said first end to prevent said thermal energy from affecting the movement of said piston means in the bore and said third cylindrical body with respect to the button means.

2. The brake, as recited in claim 1, wherein said actuator mechanism further includes:

an end cap secured to said second end of said first cylindrical body to provide a protective cover to prevent the communication of any dust generated during a brake application which could affect the movement of said third cylindrical body by the piston means with respect to said button means.

3. The brake, as recited in claim 2, wherein said actuator mechanism further includes:

a wiper seal secured to said housing for engaging said first cylindrical body to prevent contamination of said bore by any dust generated during a brake application which could affect the movement of said piston means in said bore.

4. The brake, as recited in claim 3, wherein said inwardly projecting flange on said second tube member engages said button means to limit the maximum movement of said piston means toward said pressure plate and thereby prevent the pressure of the fluid in said chamber from moving said piston means from said bore.

* * * * *